Jan 6, 1931.    F. J. WILKINS    1,787,925
LOCKING DEVICE FOR ENVELOPES
Filed Feb. 29, 1928

INVENTOR
Frank J. Wilkins
ATTORNEY

Patented Jan. 6, 1931

1,787,925

UNITED STATES PATENT OFFICE

FRANK J. WILKINS, OF CINCINNATI, OHIO

LOCKING DEVICE FOR ENVELOPES

Application filed February 29, 1928. Serial No. 258,057.

The object of my invention is to produce a cheap, simple and effective locking device for locking the opening and closing flap of an envelope to the body of the envelope, making an article of marked utility.

In envelopes, especially the heavy ones made of strong heavy paper, the gummed opening and closing flap often opens while in the mail, allowing all or part of the contents to fall out, causing loss, inconvenience and trouble. The gummed flap does not adhere properly to the body of the envelope, either because the gummed flap carries an inferior gummed surface, or has not been properly made to adhere.

Where the envelope is made of stiff or heavy paper, it is a difficult task for the manufacturer to properly gum the closing flap.

When heavy envelopes get old, they are still harder to close as the gummed part cracks and wrinkles. The adhesive material for closing the envelopes is often of an inferior quality, and this prevents proper adherence of the flap to the envelope body.

The above are some of the reasons which prevent proper and satisfactory mail carriage.

In order to over-come the above objections I have invented a locking device for connecting the closing flaps to the envelope body which will prevent the envelope from opening up and insure safe carriage.

The various features of my invention and their advantages will readily become apparent from reading the following specification.

Figure 1:
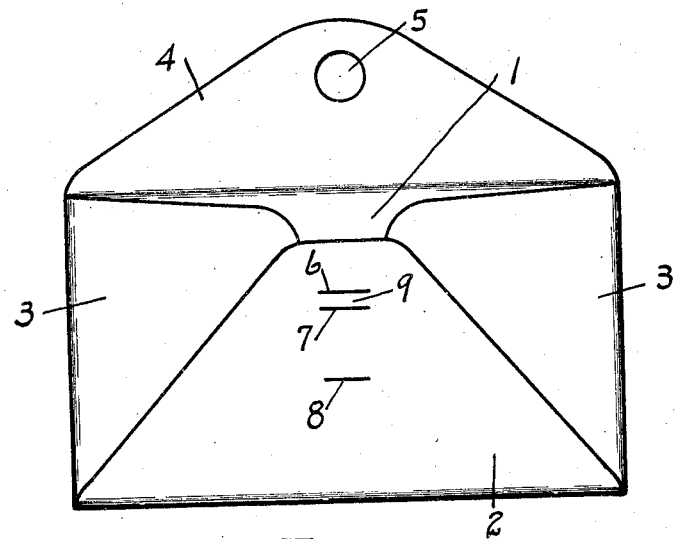
Figure 2:
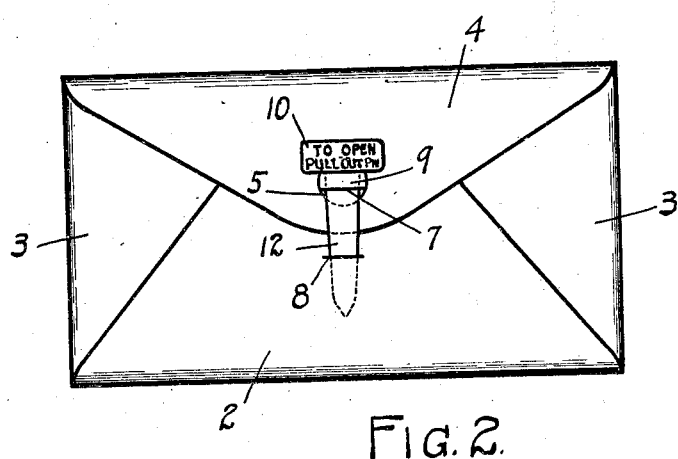
Figure 3:
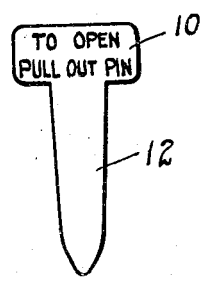

In the accompanying drawing, forming part of this specification:

Fig. 1, is a view in elevation of an envelope looking at same from the back thereof, with the closing flap open to illustrate the invention, Fig. 2, is a similar view except that the envelope is closed, showing my locking device in position, and Fig. 3, is a view in elevation of the pin which I use in this device for locking the flap to the body of the envelope.

In the drawing, the front flap of the envelope is marked 1, the rear flap 2, the side flap 3, and the closing flap 4.

In the closing flap 4 I place or form a hole or opening 5 and in the rear flap 2 I form or place the slits. The slits 6 and 7 are spaced apart so as to form the retainer or holding strip 9.

In order to hold the closing flap 4 in position on the body of the envelope I use a pin or locker formed of a head 10 and a shank 12, usually of wedge shape, but it may be made of any other desirable shape or form.

In locking the envelope, the closing flap is folded over into position on the body of the envelope, the pin formed of head 10 and shank 12 is then inserted through hole 5 and into and through slits 6 and 7 and then into slit 8, leaving the holding band 9 so that it will rest over the shank 12 of the locking pin. To open the envelope, the locking pin is pulled out as indicated on the head 10 thereof.

The envelope is securely locked against displacement, except by human agency.

While I have described one form of carrying my invention into practice, it may be somewhat changed and modified and I claim any changes or modifications which fall within the scope of this specification and the appended claims.

What I claim as new and my invention and desire to secure by Letters Patent is:—

1. In combination an envelope comprising a back and a closing flap, the flap having an opening therein, the back having an integral strap beneath the opening in the flap and further having a slit immediately beyond the edge of the flap and a pin having a head at one end and a point at the other, the point being insertable beneath the strap and exteriorly of the flap and extending into the interior of the envelope through the slit, the head of the pin lying flat upon the flap.

2. In combination an envelope comprising a back having a pair of slits forming an integral strap and another slit spaced from said strap, a closing flap having an aperture adapted to overlie the strap when said flap is in a normal closing position, and a pin having an end extending over the flap and beneath the strap and into the slit, the pin having a flat head lying upon the exterior face of the flap.

3. In combination an envelope comprising a back and an apertured flap foldable over the back to close the envelope, an integral strap on the back positioned for entry in the aperture in the flap, said back having a slit adjacent the free edge of the flap, and an insertable securing pin for entry beneath the strap from the outside of the closed flap and passing across the free edge of said flap into the slit.

4. A mailing device comprising a back and a flap thereover, the back having a pair of slits providing an integral strap and a second slit adjacent said strap, the flap having an aperture therethrough exposing the strap when the flap is folded over the back and a paper-like pin comprising a body with a point at one end and a shouldered head at the opposite end, the point of the pin being insertable beneath that portion of the strap exposed through the aperture in the flap and extending across the edge of the flap into the slit in the back with the shouldered head disposed on the exterior of the flap and precluding further insertion of the flap beneath the strap.

In testimony whereof, I affix my signature at the city of Cincinnati, county of Hamilton, and State of Ohio, this 25th day of February, 1928.

FRANK J. WILKINS.